United States Patent
Nabeshima et al.

(10) Patent No.: US 9,702,581 B2
(45) Date of Patent: Jul. 11, 2017

(54) AIR CONDITIONING SYSTEM

(71) Applicant: DAIKIN INDUSTRIES, LTD., Osaka-shi, Osaka (JP)

(72) Inventors: Norihiro Nabeshima, Kusatsu (JP); Makoto Ikeda, Kusatsu (JP)

(73) Assignee: Daikin Industries, Ltd., Osaka (JP)

(*) Notice: Subject to any disclaimer, the term of this patent is extended or adjusted under 35 U.S.C. 154(b) by 0 days.

(21) Appl. No.: 15/039,208

(22) PCT Filed: Nov. 26, 2014

(86) PCT No.: PCT/JP2014/081206
§ 371 (c)(1),
(2) Date: May 25, 2016

(87) PCT Pub. No.: WO2015/080138
PCT Pub. Date: Jun. 4, 2015

(65) Prior Publication Data
US 2017/0023271 A1    Jan. 26, 2017

(30) Foreign Application Priority Data
Nov. 29, 2013   (JP) ................. 2013-248697

(51) Int. Cl.
*H04L 29/08* (2006.01)
*F24F 11/00* (2006.01)
(Continued)

(52) U.S. Cl.
CPC ........ *F24F 11/006* (2013.01); *F24F 11/0012* (2013.01); *G08C 17/02* (2013.01);
(Continued)

(58) Field of Classification Search
CPC ........... H04L 29/08; G08C 17/02; F24F 11/00
(Continued)

(56) References Cited

U.S. PATENT DOCUMENTS 8,261,231 B1 *   9/2012   Hirsch .................. G06F 8/20
                                                        709/201
2011/0125891 A1   5/2011   Kawai
(Continued)

FOREIGN PATENT DOCUMENTS

CN        102113341 A      6/2011
EP        2 175 364 A1     4/2010
(Continued)

OTHER PUBLICATIONS

International Search Report of corresponding PCT Application No. PCT/JP2014/081206 dated Feb. 17, 2015.
(Continued)

*Primary Examiner* — Michael T Vu
(74) *Attorney, Agent, or Firm* — Global IP Counselors, LLP

(57) ABSTRACT

An air conditioning system includes air conditioners having a room temperature sensor to detect temperature of rooms, a mobile terminal carried by a user, and information mediation devices configured to cause exchange of information between the air conditioners and the mobile terminal using a public circuit. An air-conditioning management program installed in the mobile terminal is capable of causing an image that includes information related to a registered plurality of the air conditioners to be displayed on a display screen of the mobile terminal. When the rooms have been determined to be in a predetermined high-temperature state based on detection results of the room temperature sensor of the registered air conditioners, the information mediation devices provide a push-notification about the high-temperature information to the mobile terminal.

6 Claims, 17 Drawing Sheets

(51) Int. Cl.
    *G08C 17/02* (2006.01)
    *H04M 1/725* (2006.01)
(52) U.S. Cl.
    CPC ....... *H04L 67/26* (2013.01); *F24F 2011/0061* (2013.01); *F24F 2011/0068* (2013.01); *F24F 2011/0071* (2013.01); *F24F 2011/0091* (2013.01); *G08C 2201/30* (2013.01); *H04M 1/72533* (2013.01)
(58) Field of Classification Search
    USPC .................................................. 455/420–422
    See application file for complete search history.

(56) References Cited

U.S. PATENT DOCUMENTS

| | | | | |
|---|---|---|---|---|
| 2013/0261805 | A1* | 10/2013 | Kuroiwa | F24F 11/0086 |
| | | | | 700/276 |
| 2013/0261821 | A1* | 10/2013 | Lu | H04L 12/2807 |
| | | | | 700/289 |
| 2014/0324231 | A1 | 10/2014 | Kawai | |
| 2015/0061879 | A1* | 3/2015 | Sone | G05B 15/02 |
| | | | | 340/635 |

FOREIGN PATENT DOCUMENTS

| | | |
|---|---|---|
| JP | 2002-142271 A | 5/2002 |
| JP | 2004-77078 A | 3/2004 |
| JP | 2005-27025 A | 1/2005 |
| JP | 2012-10001 A | 1/2012 |
| JP | 2013-104645 A | 5/2013 |
| JP | 2013-168734 A | 8/2013 |
| JP | 2013-217534 A | 10/2013 |

OTHER PUBLICATIONS

International Preliminary Report of corresponding PCT Application No. PCT/JP2014/081206 dated Jun. 9, 2016.
European Search Report of corresponding EP Application No. 14 86 6247.1 dated Nov. 21, 2016.

* cited by examiner

AIR CONDITIONING SYSTEM

CROSS-REFERENCE TO RELATED APPLICATIONS

This U.S. National stage application claims priority under 35 U.S.C. §119(a) to Japanese Patent Application No. 2013-248697, filed in Japan on Nov. 29, 2013, the entire contents of which are hereby incorporated herein by reference.

TECHNICAL FIELD

The present invention relates to an air conditioning system capable of exchanging information between a mobile terminal and an air conditioner via an information-mediating device.

BACKGROUND ART

In the prior art, there are systems capable of exchanging information between a mobile terminal and an air conditioner or other electrical equipment via an information mediation device, an example being that of a system in which the operating conditions or the like of an electrical equipment are acquired via the Internet from a mobile terminal carried by a user, as disclosed in Japanese Laid-open Patent Publication No. 2005-27025.

SUMMARY

Technical Problem

When room temperature becomes too high, people and fixtures in rooms may be affected. Accordingly, it would be desirable to provide information to a mobile terminal that the room temperature is high. It would also be convenient for the user to be able to confirm such information on a mobile terminal for not only a home, but also a different location such as a parent's home and/or a work place.

In view of the above, an object of the present invention is to provide an air conditioning system that allows a user to confirm information about high temperatures in different locations in a simple manner using a mobile terminal.

Solution to Problem

An air conditioning system according to a first aspect of the present invention comprises air conditioners, a mobile terminal, and information mediation devices. The air conditioners have a room temperature sensor for detecting the temperature of rooms. The mobile terminal is carried by a user of the air conditioners. The information mediation devices cause exchange of information between the air conditioners and the mobile terminal using a public circuit. The air-conditioning management program installed in the mobile terminal is capable of causing an image containing information related to a registered plurality of the air conditioners to be displayed on a display screen of the mobile terminal. When the rooms have been determined to be in a predetermined high-temperature state on the basis of detection results of the room temperature sensor of the registered air conditioners, the information mediation devices provide push-notification about the high-temperature information to the mobile terminal so as to allow the user to confirm high-temperature information corresponding to the determination results.

In the air conditioning system according to the first aspect of the present invention, high-temperature information for registered air conditioners is provided to a mobile terminal by push notification. Accordingly, registering a plurality of air conditioners in not only one's home, but also in different locations such as, e.g., a parent's home and/or a work place allows high-temperature information in different locations to be received in a single mobile terminal.

A user can thereby confirm information about high temperatures in different locations in a simple manner using a mobile terminal.

An air conditioning system according to a second aspect of the present invention is the air conditioning system according to the first aspect, wherein the information mediation devices have an adapter connected to each of the air conditioners, and the air-conditioning management program is capable of causing a registration image for registering the air conditioners for each adapter to be displayed on the display screen of the mobile terminal. Accordingly, in this air conditioning system, a plurality of air conditioners can be registered for each adaptor from the mobile terminal.

An air conditioning system according to a third aspect of the present invention is the air conditioning system according to the first or second aspect, wherein an input section transmitting from a push notification image to an actuation image is included in the push notification image. The push notification image is displayed on the display screen of the mobile terminal when a push notification has been carried out. The actuation image transmits information related to the start of operation of the air conditioner to the information mediation devices. Actuating the input section in this air conditioning system causes the display on the display screen to transition from a push notification image to an actuation image. Therefore, the user can start the operation of the air conditioner in a simple manner after push notification.

An air conditioning system according to a fourth aspect of the present invention is the air conditioning system according to the third aspect, wherein the air-conditioning management program causes to display a popup message image on the actuation image to prompt the start of operation of the air conditioner when a transition has been made from the push notification image to the actuation image. In this air conditioning system, a popup message image prompting that the air conditioner be started up is displayed, thereby making is possible to prompt the user to start up the air conditioner.

An air conditioning system according to a fifth aspect of the present invention is the air conditioning system according to the first to fourth aspects, wherein the air conditioners determine whether the rooms are in the predetermined high-temperature state on the basis of the detection results of the room temperature sensor after an air-ventilation operation has been carried out. Since performing an air-ventilation operation circulates room air, in this air conditioning system, determining whether the rooms are in a predetermined high-temperature state after an air-ventilation operation has been carried out makes it possible to reduce the possibility of errantly determining whether or not the rooms are in a high-temperature state.

It is thereby possible to reduce the likelihood that frequent push notification will be carried out.

Advantageous Effects of Invention

In the air conditioning system according to the first aspect of the present invention, a user can confirm information about high temperatures in different locations in a simple manner using a mobile terminal.

In the air conditioning system according to the second aspect of the present invention, a plurality of air conditioners can be registered for each adaptor from a mobile terminal.

In the air conditioning system according to the third aspect of the present invention, a user can start up an air conditioner in a simple manner after push notification.

In the air conditioning system according to the fourth aspect of the present invention, it is possible to prompt the user to start up an air conditioner.

In the air conditioning system according to the fifth aspect of the present invention, it is possible to reduce the likelihood that frequent push notification will be carried out.

DESCRIPTION OF EMBODIMENTS

The air conditioning system 100 according to an embodiment of the present invention is described below with reference to the drawings. The following embodiment is a specific example of the present invention and does not limit the technical scope of the present invention, it being possible for suitable modifications to be made in a range that does not depart from the spirit of the invention.

(1) Configuration of the Air Conditioning System 100

(1-1) General Overview

Figure 1:
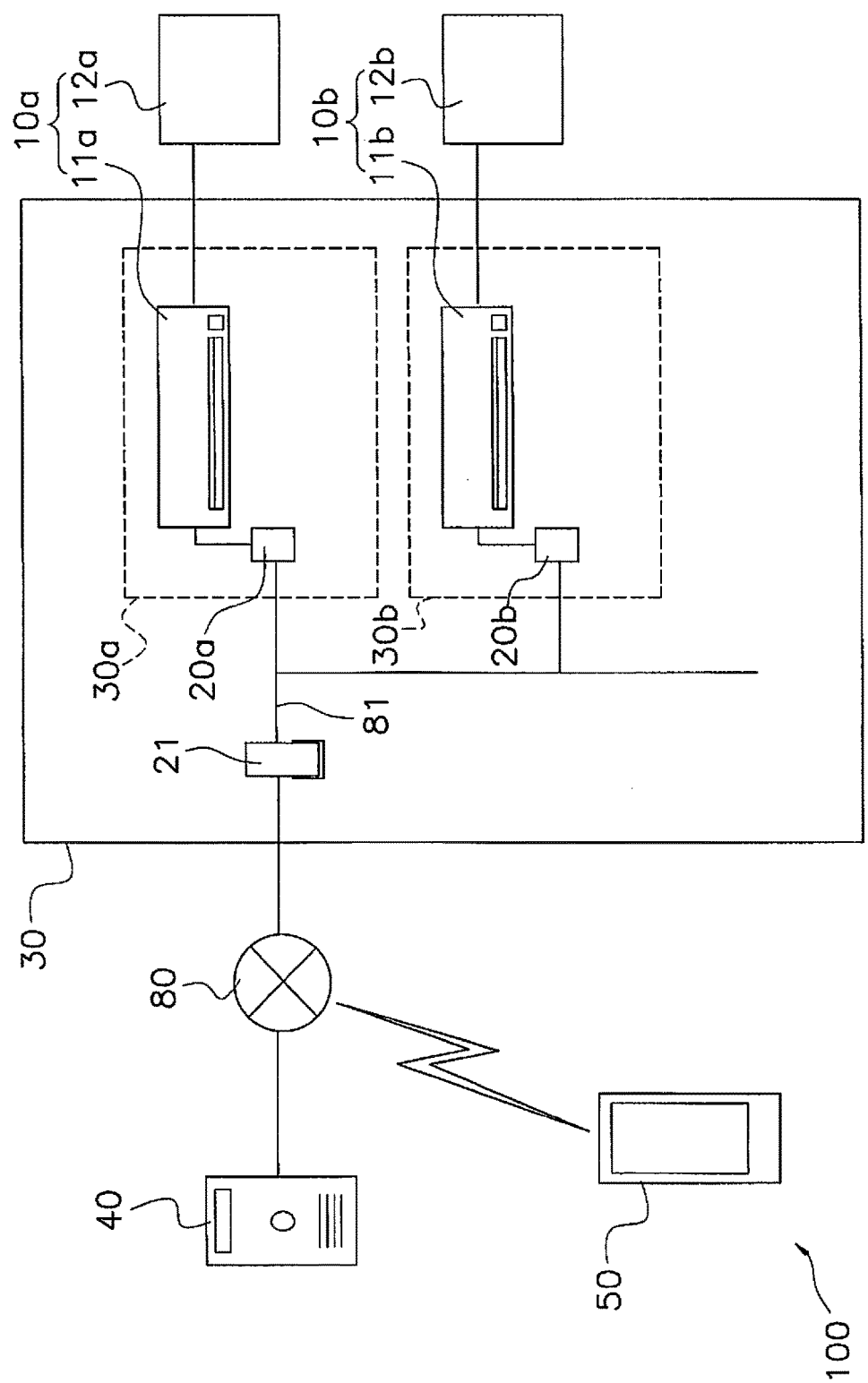
FIG. 1 is a block diagram of the air conditioning system according to an embodiment of the present invention.

FIG. 1 shows the overall configuration of the air conditioning system 100. The air conditioning system 100 acquires information about predetermined air conditioners 10a, 10b, . . . from a mobile terminal 50 personally carried by the user via adapters 20a, 20b, . . . and a server 40 as information mediation devices, and actuates air conditioners 10a, 10b, . . . .

A router 21 for connecting a public circuit (hereinafter referred to as the Internet) 80 and a local area network (hereinafter referred to as LAN) installed in a building 30 is disposed in the building 30. The adapters 20a, 20b, . . . connected to the air conditioners 10a, 10b, . . . are connected to a LAN 81. In addition to the adapters 20a, 20b, . . . , a personal computer, printer, and other network equipment (not shown) used in the building 30 may also be connected to the LAN 81.

The air conditioners 10a, 10b, . . . must be registered in advance in the server 40 in order to manage the air conditioners 10a, 10b, . . . via the server 40 using the mobile terminal 50.

Only one building 30 is shown in FIG. 1 in order to facilitate description. However, air conditioners 10a, 10b, . . . dispersed in a plurality of buildings 30 are included in an actual air conditioning system 100.

(2) Detailed Configuration of the Air Conditioning System 100

(2-1) Air Conditioners 10a, 10b, . . .

As shown in FIG. 1, the air conditioners 10a, 10b, . . . have room units 11a, 11b, . . . disposed in rooms 30a, 30b, . . . of a building 30, and outdoor units 12a, 12b, . . . disposed outside the building 30. The room units 11a, 11b, . . . are connected in a one-to-one relationship to the adapters 20a, 20b, . . . .

The room units 11a, 11b, . . . and the outdoor units 12a, 12b, . . . are connected to each other via a refrigerant tube and form a refrigerant circuit composed of compressors, heat exchangers, and the like.

Figure 2:
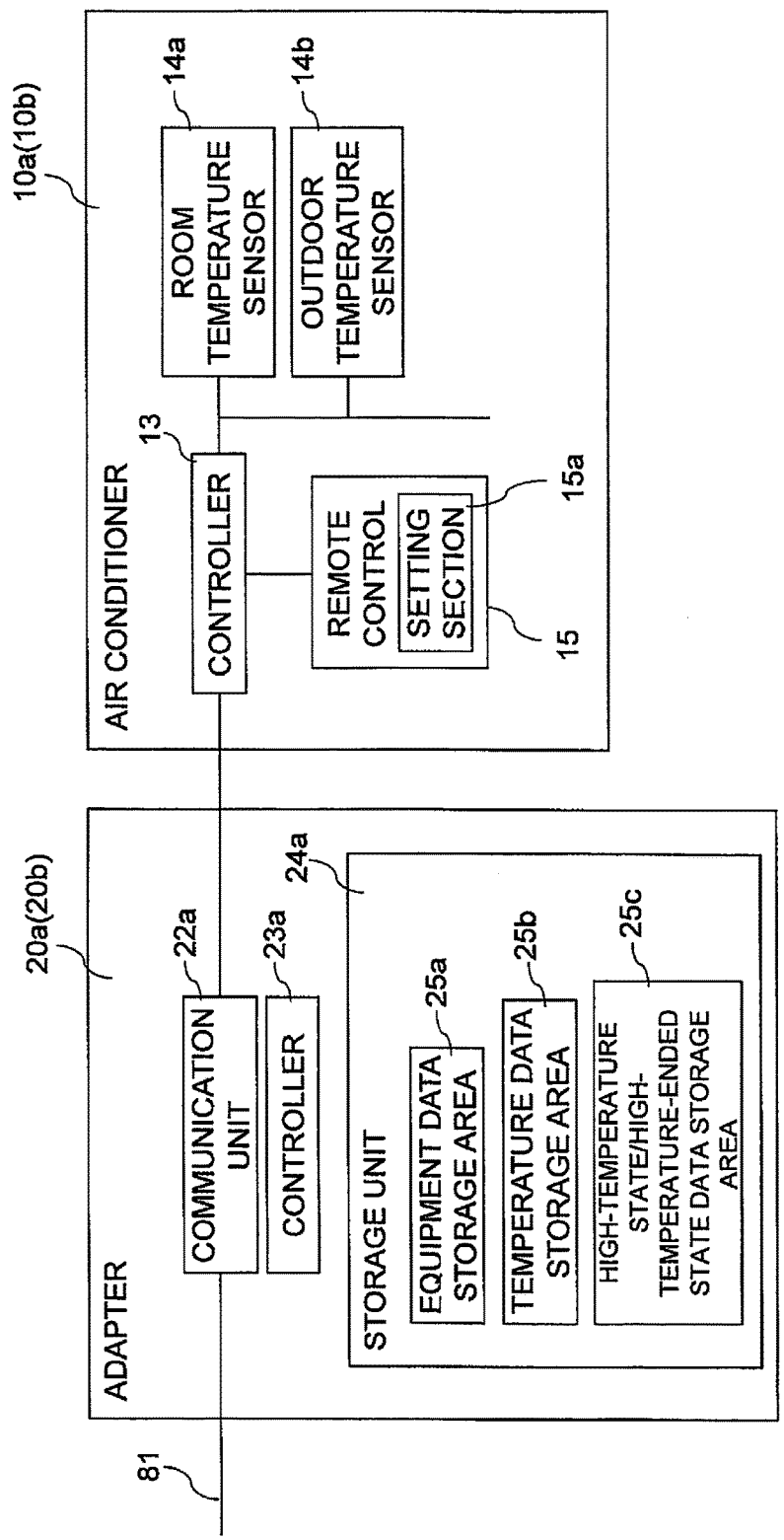
FIG. 2 is a block diagram of the air conditioners and adapters.

As shown in FIG. 2, the air conditioners 10a, 10b, . . . have various sensors. For example, the room units 11a, 11b, . . . have a room temperature sensor 14a for detecting the temperature of the rooms 30a, 30b, . . . in which the room units 11a, 11b, . . . are disposed. The outdoor units 12a, 12b, . . . have an outdoor temperature sensor 14b for detecting the outdoor temperature near the building 30.

The air conditioners 10a, 10b, . . . have a control unit 13. The controller 13 is an assembly of units for controlling the room units 11a, 11b, . . . and the outdoor units 12a, 12b, . . . included in the air conditioners 10a, 10b, . . . .

The controller 13 controls the operation of the air conditioners 10a, 10b, . . . , i.e., controls the actuation of compressors and the like included in the refrigerant circuit, in accordance with operation commands to the air conditioners 10a, 10b, . . . inputted by the user of the rooms 30a, 30b, . . . via a remote control 15.

The controller 13 transmits equipment data related to the air conditioners 10a, 10b, . . . to the adapters 20a, 20b, . . . . For example, the controller 13 transmits data to the adapters 20a, 20b, . . . ; the data showing the contents of operation commands inputted via the remote control 15 to the air conditioners 10a, 10b, . . . . Data that shows the contents of the operation commands includes start/stop operation of the air conditioners 10a, 10b, . . . , operation modes (air-cooling mode, air-warming mode, ventilation mode, and the like), setting temperature, and a later-described ON/OFF setting for a high-temperature prevention function.

The controller 13 transmits the temperature data related to room temperature and outdoor temperature to the adapters 20a, 20b, . . . . Specifically, the controller 13 transmits room temperature data detected by the room temperature sensor 14a and outdoor temperature data detected by the outdoor temperature sensor 14b to the adapters 20a, 20b, . . . .

The air conditioners 10a, 10b, . . . have a monitoring function for determining whether the rooms 30a, 30b, . . . are in a predetermined high-temperature state. In the monitoring of the present embodiment, the controller 13 controls the air conditioners 10a, 10b, . . . that have been stopped so that a ventilation operation, in which the room fans of the room units 11a, 11b, . . . are rotated, can be carried out for a predetermined length of time (e.g., five minutes), and thereafter determines whether the rooms 30a, 30b, . . . in which the room units 11a, 11b, . . . are disposed are at a predetermined high-temperature state on the basis of the detection results of the room temperature sensor 14a. More specifically, after a ventilation operation, the controller 13 determines that the rooms 30a, 30b, . . . are in a high-temperature state when the temperature detected by the room temperature sensor 14a is at a predetermined temperature (e.g., 30 degrees) or higher. When the temperature detected by the room temperature sensor 14a is less than the predetermined temperature after the rooms 30a, 30b, . . . had been determined to be in a high-temperature state, the controller 13 determines that the rooms 30a, 30b, . . . are in a high-temperature-ended state in which the high-temperature state no longer exists. The user can set whether to use the monitoring function, i.e., whether the monitoring function is ON or OFF, and only when the monitoring function is set to ON, the controller 13 transmits data related to a high-temperature state/high-temperature-ended state to the adapters 20a, 20b, . . . when a high-temperature state has been determined. In other words, when the monitoring function is set to OFF, no ventilation operation is carried out and no determination is made about a high-temperature state, and data related to high-temperature state/high-temperature-ended state is not transmitted to the adapters 20a, 20b, . . . .

Furthermore, the air conditioners 10a, 10b, . . . have a high-temperature prevention function for automatically starting an air-cooling operation of the air conditioners 10a, 10b, . . . when a high-temperature state has been determined by the controller 13, and for automatically stopping the air-cooling operation of the air conditioners 10a, 10b, . . . when a high-temperature-ended state has been determined by the controller 13. The user can actuate a setting section 15a in the remote control 15 to set whether to use the high-temperature prevention function, i.e., whether the high-temperature prevention function is ON or OFF. The data related to ON/OFF setting of the high-temperature prevention state is transmitted to the adapters 20a, 20b, . . . as equipment data related to the air conditioners 10a, 10b, . . . as described above.

The controller 13 executes control commands transmitted from the adapters 20a, 20b, . . . . The control commands transmitted from the adapters 20a, 20b, . . . are, e.g., operation commands to the room units 11a, 11b, . . . , or commands to transmit specific equipment data to the adapters 20a, 20b, . . . .

(2-2) Information Mediation Devices

The information mediation devices exchange information between the air conditioners 10a, 10b, . . . and the mobile terminal 50 using the Internet 80. The information mediation devices include the adapters 20a, 20b, . . . , the router 21, and the server 40.

(2-2-1) Adapters 20a, 20b, . . .

The adapters 20a, 20b, . . . are network adapters for connecting the air conditioners 10a, 10b, . . . to the LAN 81 and are externally provided to the room units 11a, 11b, . . . in the present embodiment. The adapters 20a, 20b, . . . may be internally provided to the room units 11a, 11b, . . . .

The adapters 20a, 20b, . . . have a communication unit 22a, a controller 23a, and a storage unit 24a, as shown in FIG. 2, and have a control function for controlling the air conditioners 10a, 10b, . . . in addition to a communication function for accommodating differences in communication protocol between networks.

A control program and control data are stored in the storage unit 24a. The control program and control data execute the control program while referring to the control data.

An equipment data storage area 25a, a temperature data storage area 25b, and a high-temperature state/high-temperature-ended state data storage area 25c are reserved in the storage unit 24a. The equipment data storage area 25a is used for temporarily holding equipment data transmitted from the air conditioners 10a, 10b, . . . . The temperature data storage area 25b is used for temporarily holding temperature data transmitted from the air conditioners 10a, 10b, . . . . The high-temperature state/high-temperature-ended state data storage area 25c is used for temporarily holding data related to a high-temperature state and data related to a high-temperature-ended state transmitted from the air conditioners 10a, 10b, . . . . The controller 23a periodically (e.g., every 1 minute) transmits equipment data in the equipment data storage area 25a, temperature data in the temperature data storage area 25b, and data related to a high-temperature state/high-temperature-ended state in the high-temperature state/high-temperature-ended state data storage area 25c to the server 40 as periodic notification data.

An identification number for the server address and adapters 20a, 20b, . . . are stored in advance in the storage unit 24a. Furthermore, equipment ID assigned to the server 40 is stored in the storage unit 24a. The equipment ID is information for uniquely identifying the adapters 20a, 20b, . . . on the server 40.

(2-2-2) Router 21

When the adapters 20a, 20b, . . . are connected to the LAN 81, the router 21 automatically detects the presence of the adapters 20a, 20b, . . . and registers the network information of the adapters 20a, 20b, . . . . The adapters 20a, 20b, . . . are thereby able to communicate with other network equipment on the LAN 81 and network equipment on the Internet 80.

(2-2-3) Server 40

Figure 3:
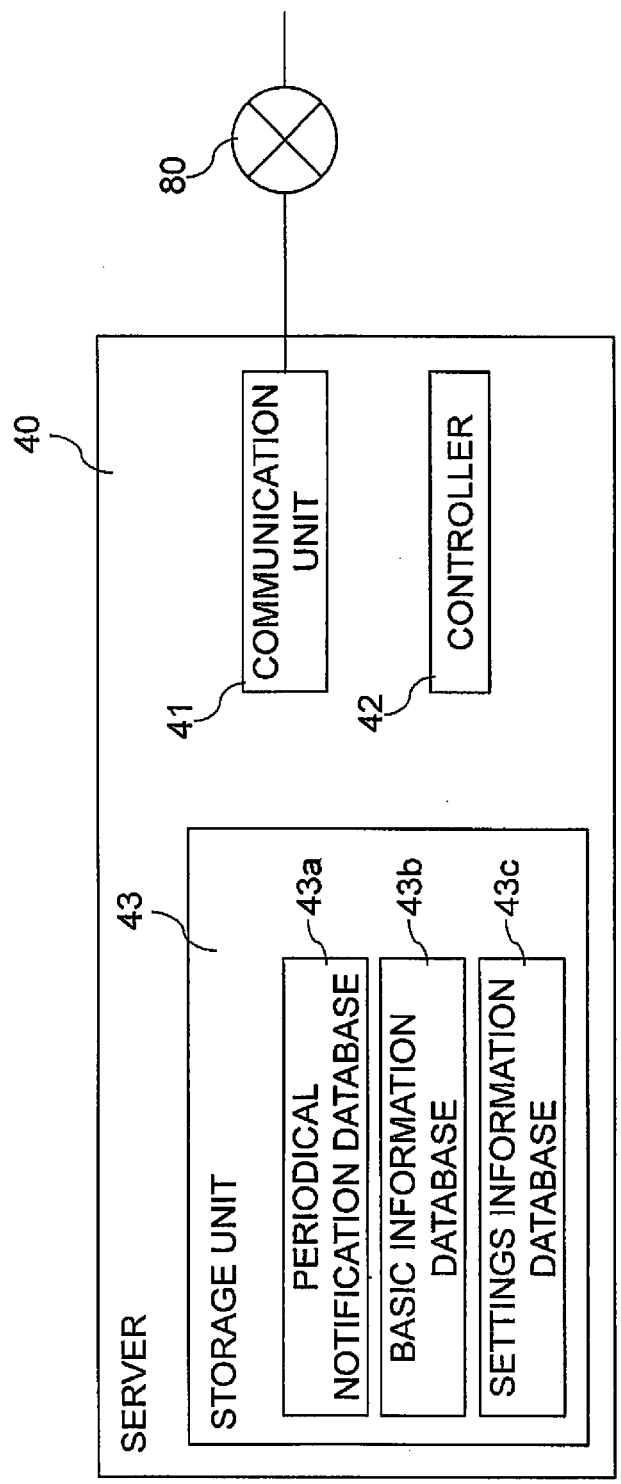
FIG. 3 is a block diagram of the server.

The server 40 has a communication unit 41, a controller 42, and a storage unit 43, as shown in FIG. 3.

The communication unit 41 carries out communication functions of the server 40 and is capable of connecting the server 40 to the Internet 80, i.e., communicating with the air conditioners 10a, 10b, . . . and the mobile terminal 50.

Various databases for accumulating various data related to the air conditioners 10a, 10b, . . . are defined in the storage unit 43.

For example, a periodic notification database 43a for accumulating periodic notification data transmitted from the adapters 20a, 20b, . . . to the server 40 via the Internet 80 is defined in the storage unit 43. Various data related to the air conditioners 10a, 10b, . . . are saved in the periodic notification database 43a so as to be correlated with the equipment ID assigned to the adapters 20a, 20b, . . . connected to the air conditioners 10a, 10b, . . . . Accordingly, various data related to the air conditioners 10a, 10b, . . . can be managed for each of the adapters 20a, 20b, . . . , i.e., each of the air conditioners 10a, 10b, . . . .

A basic information database 43b for saving basic registration information (hereinafter referred to as basic information) related to the air conditioners 10a, 10b, . . . is defined in the storage unit 43. The equipment ID of the adapters 20a, 20b, . . . , data related to various functions of the air conditioners 10a, 10b, . . . to which the adapters 20a, 20b, . . . are connected, and other information are saved as a single record in the basic information database 43b. The records in the basic information database 43b correspond one-to-one to the air conditioners 10a, 10b, . . . .

A settings information database 43c for saving information related to various settings made by the user of the air conditioners 10a, 10b, . . . is defined in the storage unit 43.

Saved in the settings information database 43c as a single record are equipment IDs of the adapters 20a, 20b, . . . of the registered air conditioners 10a, 10b, . . . , equipment names arbitrarily set for the air conditioners 10a, 10b, . . . by the user, the ON/OFF setting of the high-temperature prevention function of the air conditioners 10a, 10b, . . . connected to the adapters 20a, 20b, . . . , permission to actuate (ON/OFF) the air conditioners 10a, 10b, . . . from the exterior, personal information of the user including the login ID and password assigned to the user of the air conditioners 10a, 10b, . . . , necessity (ON/OFF) to provide push notification to the mobile terminal 50 carried by the user, and other information. The password is used for authenticating login authority when the user logs into the server 40 using a login ID. The records in the settings information database 43c correspond one-to-one to a user.

The controller 42 is composed of a CPU, RAM, ROM, and the like, and executes a control program stored in the storage unit 43. The controller 42 transmits various data saved in the database to the mobile terminal 50 of the user via the Internet 80. In addition to predetermined information transmitted by push notification, the controller 42 transmits the various data to the mobile terminal 50 in accordance with an information transmission request from the mobile terminal 50 via the Internet 80. The controller 42 also transmits actuation information as control commands to the adapters 20a, 20b, . . . as received from the mobile terminal 50 via the Internet 80. The control commands are transmitted from the server 40 to the adapters 20a, 20b, . . . when periodic notification data has been received from the adapters 20a, 20b, . . . . Also, each of the air conditioners 10a, 10b, . . . is identified by the equipment ID of each of the adapters 20a, 20b, . . . .

The controller 42 provides push notification to the mobile terminal 50. As used herein, the term "push" refers to a scheme in which the server 40 actively provides notification of predetermined information to the mobile terminal 50 without an information transmission request from the mobile terminal 50. Push notification may be email or a short-mail message service, and may be data in a proprietary format. In the present embodiment, the controller 42 of the server 40 provides push notification about high-temperature information and high-temperature-ended information to the mobile terminal 50 so as to allow the user to confirm predetermined high-temperature information and predetermined high-temperature-ended information that corresponds to the determination results when the rooms 30a, 30b, . . . have been determined to be in a predetermined high-temperature state on the basis of the detection results of the room temperature sensor 14a of the registered air conditioners 10a, 10b, . . . . In the present embodiment, the high-temperature information and high-temperature-ended information are transmitted as push notification, but at least the high-temperature information can be transmitted as push notification to the mobile terminal 50.

Furthermore, after having provided a push notification of high-temperature information, the controller 42 transmits an operation prompt message image to the mobile terminal 50 when predetermined conditions have been satisfied so that the operation prompt message image containing a message related to operation startup of the air conditioners 10a, 10b, . . . is displayed as a popup. In this case, the predetermined conditions include a condition that the high-temperature prevention function has been set to OFF, a condition that the push notification setting has been set to ON, a condition that data related to the high-temperature-ended state has not been transmitted after a push notification of high-temperature information has been carried out, and a condition that there has been access from the mobile terminal 50. In the present embodiment, the server 40 transmits the operation prompt message image information to the mobile terminal 50 when the predetermined conditions have all been satisfied.

(2-3) Mobile Terminal 50

The mobile terminal 50 is carried by the user of the air conditioners 10a, 10b, . . . and examples thereof include a mobile terminal, a smartphone, a tablet computer, a notebook-type personal computer, and other portable computers. A smartphone 50 is used as the mobile terminal in the example described below.

Figure 4:
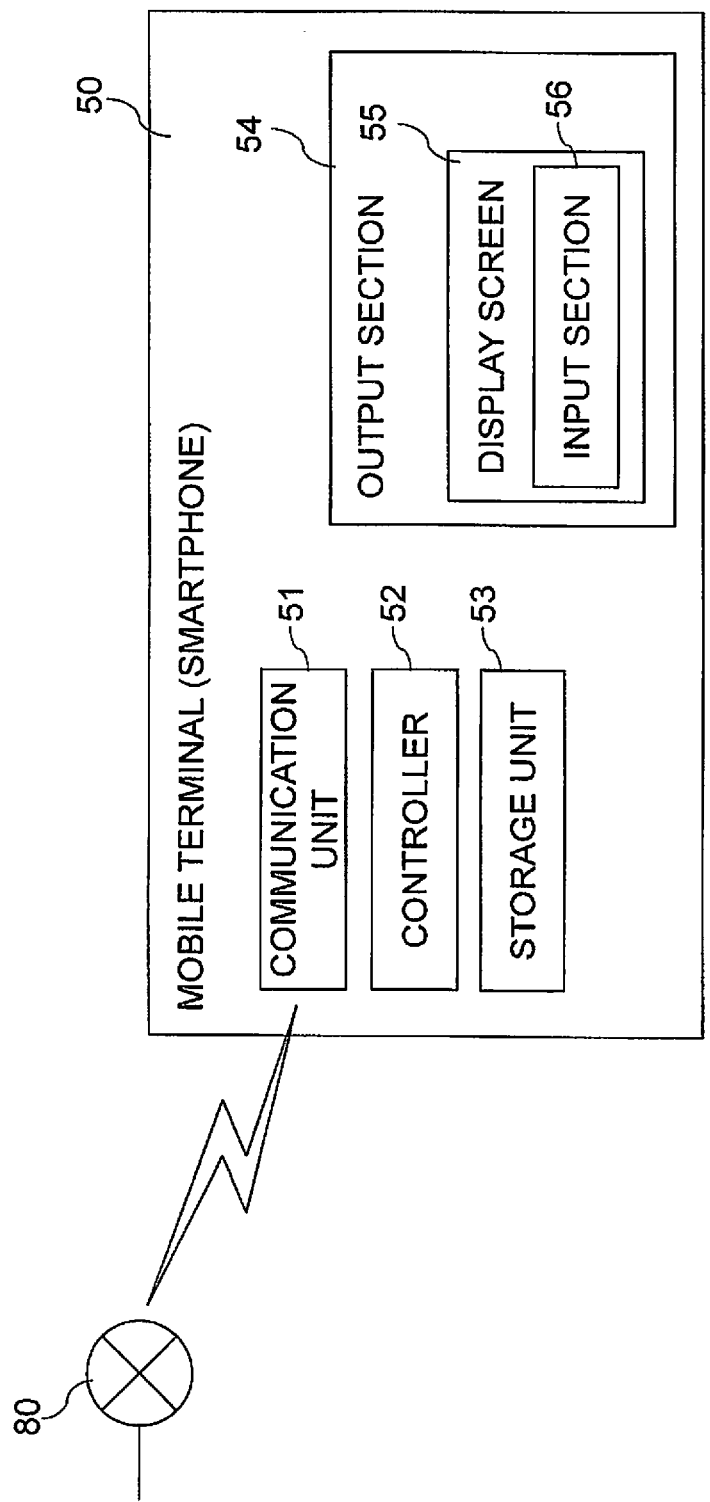
FIG. 4 is a block diagram of the mobile terminal.

As shown in FIG. 4, the smartphone 50 has a communication unit 51, a controller 52, an output section 54, and input section 56, and a storage unit 53. In addition to a talk function, the communication unit 51 is equipped with a function for connecting to the Internet 80. The controller 52 is composed of a CPU, RAM, ROM, and the like, and the storage unit 53 is composed of a flash memory or the like. The output section 54 includes a display screen 55. The input section 56 is composed of an actuation button group or the like and is included in an image displayed on the display screen 55.

An air-conditioning management program for managing the air conditioners 10a, 10b, . . . using the smartphone 50 is installed on the smartphone 50. The air-conditioning management program can be downloaded from the server 40 via the Internet 80. The air-conditioning management program is capable of displaying an image containing information related to the plurality of air conditioners 10a, 10b, . . . registered in the server 40 on the display screen 55 of the smartphone 50. The user performs equipment settings for the air conditioners 10a, 10b, . . . registered in the server 40 and actuates or otherwise instructs the air conditioners 10a, 10b, . . . via the image generated by the air-conditioning management program and provided to the display screen 55. The server address is kept in the air-conditioning management program.

(3) Various Settings (3-1) Initialization

Initialization of the air conditioners 10a, 10b, . . . is a process automatically executed by the adapters 20a, 20b, . . . connected to the air conditioners 10a, 10b, . . . . More specifically, when connect to the LAN 81, the adapters 20a, 20b, . . . are programmed to automatically transmit the fact of their own presence to the server 40 via the router 21. During transmission, each of the identification numbers of each of the adapters 20a, 20b, . . . is transmitted from each of the adapters 20a, 20b, . . . to the server 40.

When the identification number is transmitted to the adapters 20a, 20b, . . . , the controller 42 in the server 40 creates an individual equipment ID for each identification number of the adapters 20a, 20b, . . . and registers the identification number and created equipment ID in a correlated format in the basic information database 43b. The controller 42 in the server 40 also transmits the equipment ID to the corresponding adapters 20a, 20b, . . . .

When an equipment ID is transmitted from the server 40, the adapters 20a, 20b, . . . store the equipment ID in the storage unit 24a. The adapters 20a, 20b, . . . subsequently transmit to the server 40 data related to various functions of the air conditioners 10a, 10b, . . . connected to the adapters 20a, 20b, . . . .

When data related to the various functions of the air conditioners 10a, 10b, . . . are transmitted from the adapters 20a, 20b, . . . , the controller 42 in the server 40 registers the equipment ID of each of the adapters 20a, 20b, . . . and the data related to the various functions of each of the air conditioners 10a, 10b, . . . in the basic information database 43b in a correlated format. The air conditioners 10a, 10b, . . . are thereby registered in the server 40 and initialization of the air conditioners 10a, 10b, . . . is ended.

(3-2) Equipment-Setting of the Air Conditioners 10a, 10b, . . .

Equipment-setting of the air conditioners 10a, 10b, . . . is a process executed while the user manually actuates the smartphone 50 in a building 30. The user performs the equipment-setting of the air conditioners 10a, 10b, . . . by way of the image provided by the server 40 to the display screen 55 via the Internet 80. The equipment-setting of the air conditioners 10a, 10b, . . . is required to be executed after the air conditioners 10a, 10b, . . . have been initialized.

In the equipment-setting of the air conditioners 10a, 10b, . . . , the user starts the air-conditioning management program installed in the smartphone 50 and accesses the server 40. Having accepted this access, the server 40 begins processing.

The server 40 selects from among the air conditioners 10a, 10b, . . . registered in the basic information database 43b those that are present on the same LAN 81 as the smartphone 50, which is the access source, and transmits to the smartphone 50 information related to the image displaying the all air conditioners 10a, 10b, . . . connected to the same LAN 81 as the smartphone 50. An image (see FIG. 5, hereinafter referred to as equipment list image) that allows the list of registered air conditioners 10a, 10b, . . . to be confirmed is thereby displayed on the display screen 55 of the smartphone 50.

When the user subsequently taps an "Edit" button 56a serving as the input section 56 included in the equipment list image, the image transitions from the equipment list image to a settings image (see FIG. 6) for setting the equipment name of the air conditioners 10a, 10b, . . . , the installation location of the air conditioners 10a, 10b, . . . , permission to externally actuate the air conditioners 10a, 10b, . . . , and the need for push notification.

For example, when the user taps an "External actuation setting" button 56b serving as the input section 56 included in the settings image to set the external actuation setting to "ON," information that the external actuation setting has been set to "ON" is transmitted from the smartphone 50 to the server 40. The server 40 registers the information in the settings information database 43c so that external actuation of the air conditioners 10a, 10b, . . . is allowed. At the same time, the server 40 transmits information related to the password setting image to the smartphone 50. The information related to the password setting image is transmitted from the server 40, whereupon the password setting image for prompting for a password to be set is displayed on the display screen 55 of the smartphone 50. At this point, the user actuates the input section on the password setting image to input and set an arbitrary password, and the information related to the password is transmitted from the smartphone 50 to the server 40. When the information related to the password is transmitted to the server 40, the controller 42 in the server 40 creates a login ID, correlates and stores the created login ID and the password in the settings information database 43c, and transmits the information related to the confirmation screen that displays the login ID and the password to the smartphone 50. A confirmation image that allows the login ID and password to be confirmed is thereby displayed on the display screen 55 of the smartphone 50.

When the air-conditioning management program is started up the next time, the initial image containing an input location for the login ID and password is displayed on the display screen 55 of the smartphone 50. At this point, the user cannot actuate the air conditioners 10a, 10b, . . . registered in the settings information database 43c using the smartphone 50 from the exterior of the building 30 unless the user inputs the provided login ID and set password in the input location of the login ID and password contained in the initial image. Thus, making the input of a login ID and password a requirement so that the login authority can be confirmed when the air conditioners 10a, 10b, . . . are to be actuated from the exterior using the smartphone 50 allows safe actuation while avoiding fraudulent remote actuation.

When the air-conditioning management program is started up and the login ID and password is inputted in the input location for the login ID and password contained in the initial image, an information transmission request is transmitted from the smartphone 50 to the server 40. Having received the information transmission request, the server 40 transmits various data related to the air conditioners 10a, 10b, . . . stored in the database to the smartphone 50. When the information is received, the equipment list image is displayed on the display screen 55 of the smartphone 50. The user then taps an icon of the air conditioners 10a, 10b, . . . contained in the equipment list image on the display screen 55, thereby allowing the user to confirm information related to the air conditioners 10a, 10b, . . . of the corresponding icons on the display screen 55 and to actuate each of the air conditioners 10a, 10b, . . . corresponding to each of the icons.

Figure 6:
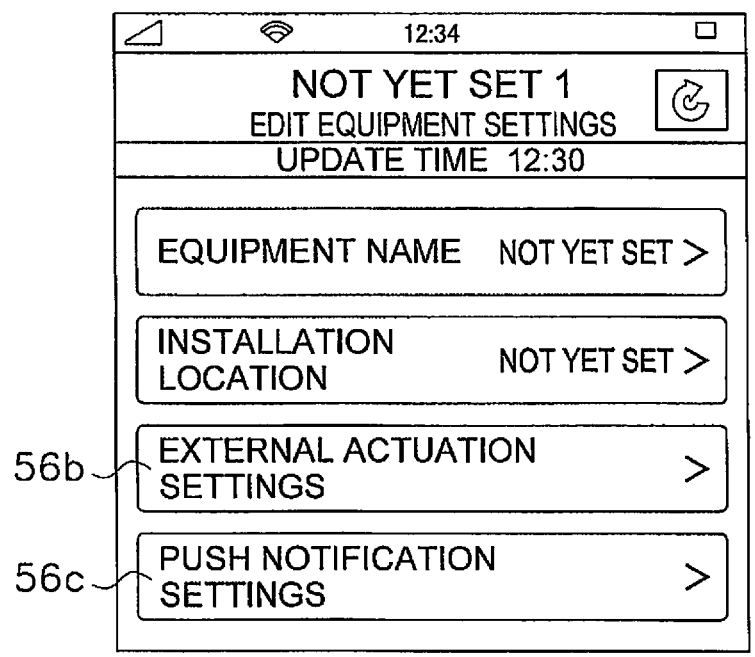
FIG. 6 shows an example of a settings image.

When the user taps a "Push notification setting" button 56c serving as the input section 56 contained in the settings image shown in FIG. 6 to switch the push notification setting to "ON," the "ON" information of the push notification setting is transmitted from the smartphone 50 to the server 40. The server 40 having received the information stores the information in the settings information database 43c so that push notification to the smartphone 50 is allowed. The server 40 thereby forcibly transmits predetermined information to the smartphone 50 even when the user has not started up the air-conditioning management program installed in the smartphone 50. The predetermined information includes information relating to data related to the high-temperature state/high-temperature-ended state stored in the periodic notification database 43a. In the present embodiment, push notification is not provided when the external actuation setting is "OFF," and when the settings image has not been actuated to set the push notification setting to "ON," i.e., when the push notification setting is "OFF."

Figure 5:
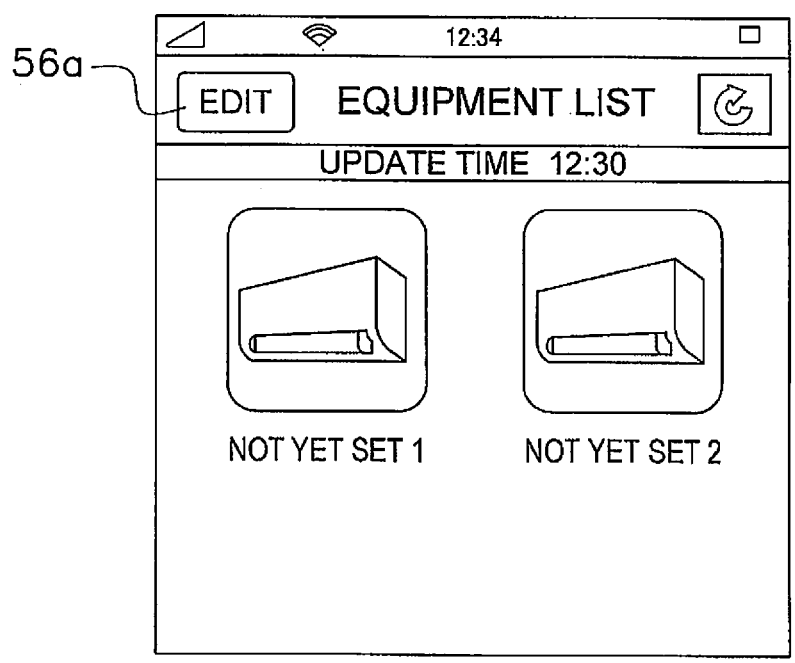
FIG. 5 shows an example of an equipment list image.

When the icon of a plurality of air conditioners 10a, 10b, . . . is displayed in the equipment list image, as shown in FIG. 5, tapping each icon and then tapping the "Edit" button 56a causes the image to transition from the equipment list image to the settings image for the equipment settings of the air conditioners 10a, 10b, . . . corresponding to the tapped icon. Accordingly, the user can set for each air conditioner 10a, 10b, . . . corresponding to the icons the equipment name of the air conditioners 10a, 10b, . . . , the installation location of the air conditioners 10a, 10b, . . . , permission to externally actuate the air conditioners 10a, 10b, . . . , and the need for push notification. In other words, the user can register in the server 40 the air conditioners 10a, 10b, . . . for which a push notification of predetermined high-temperature information and predetermined high-temperature-ended information will be acquired using the smartphone 50 for each air conditioner 10a, 10b, ... (each adapter 20a, 20b, ... ).

(4) Push Notification

Figure 7:
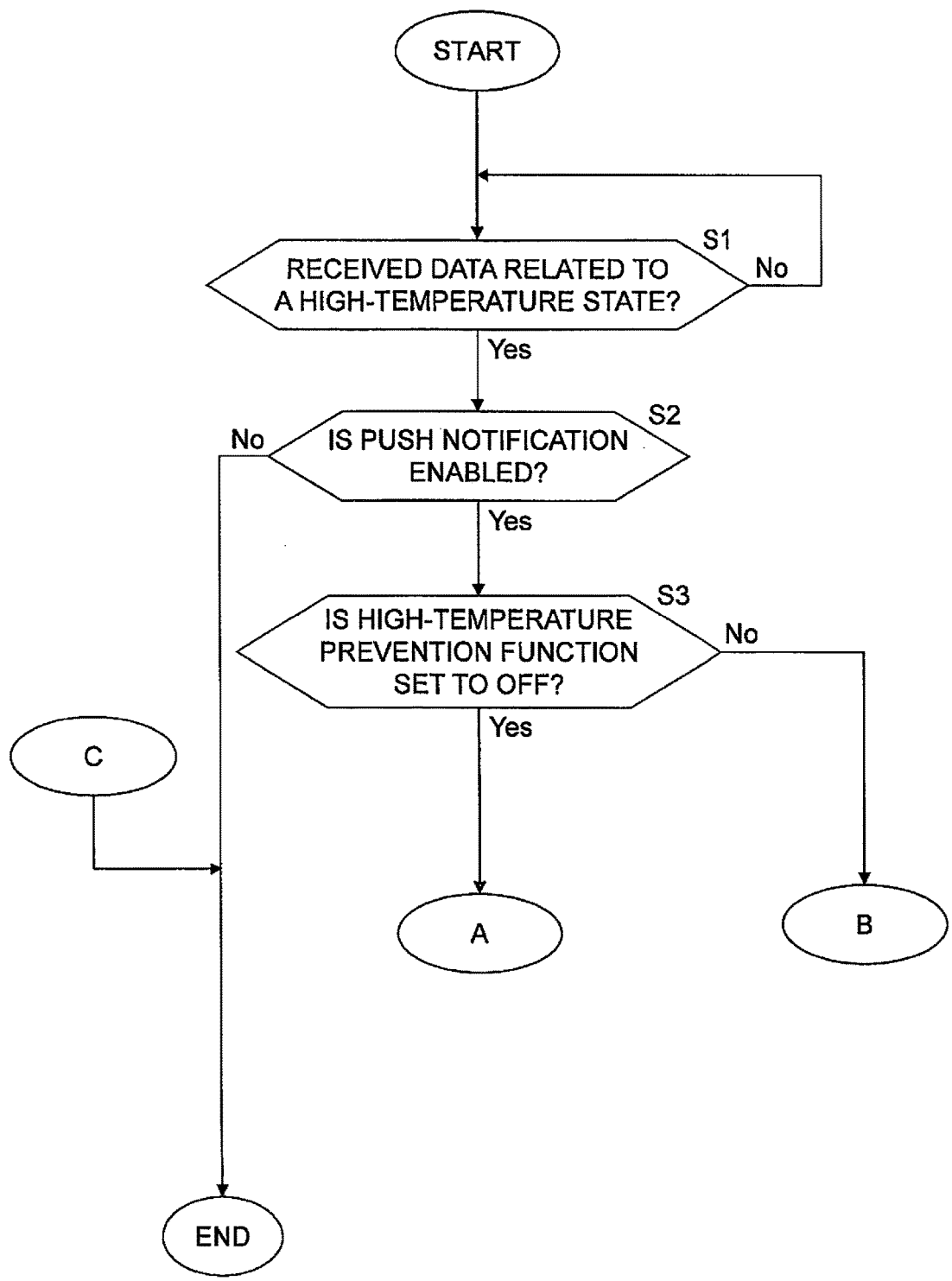
FIG. 7 is a flowchart showing the flow of push notification executed on a server.
Figure 8:
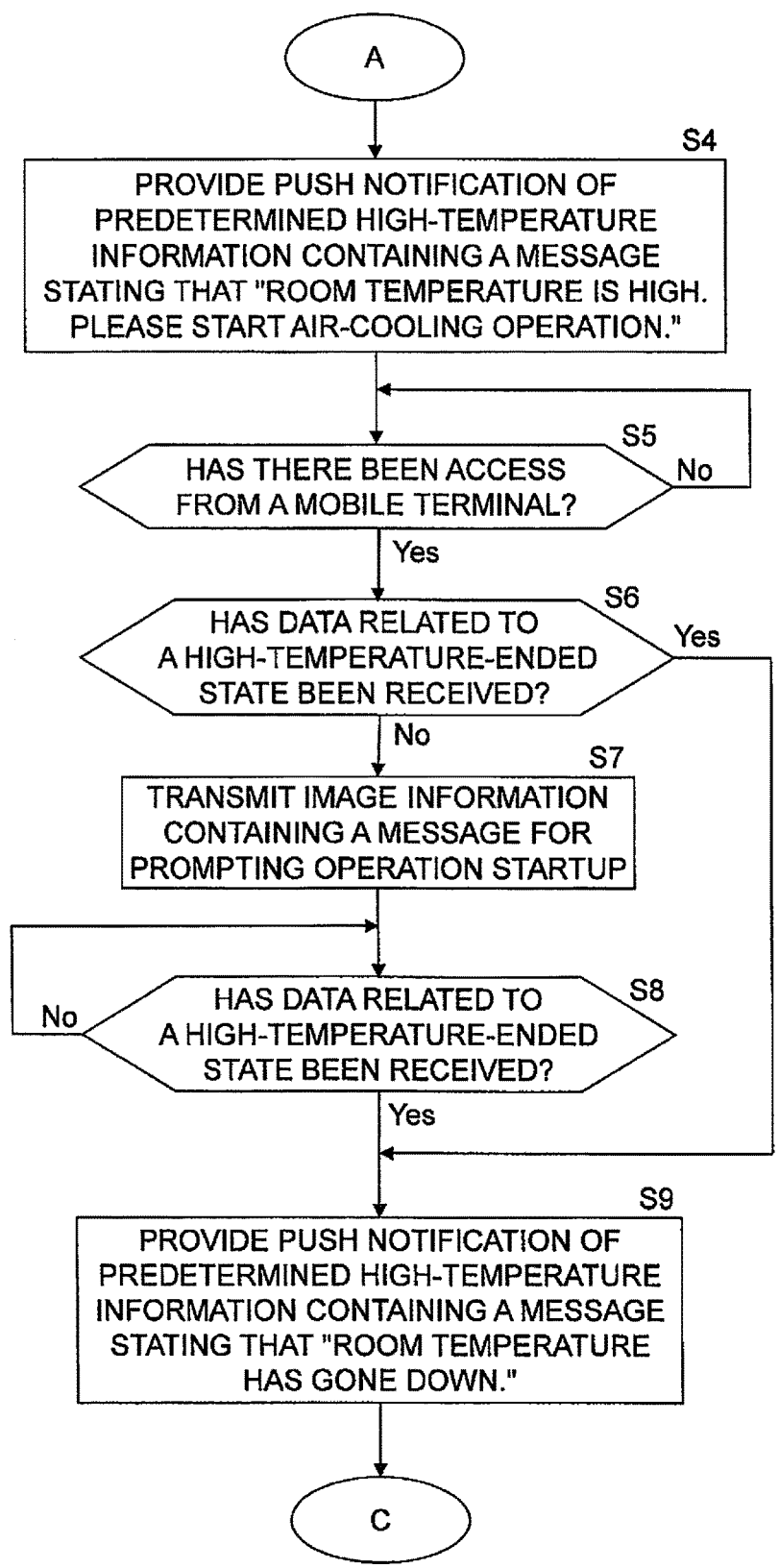
FIG. 8 is a flowchart showing the flow of push notification executed on a server.
Figure 9:
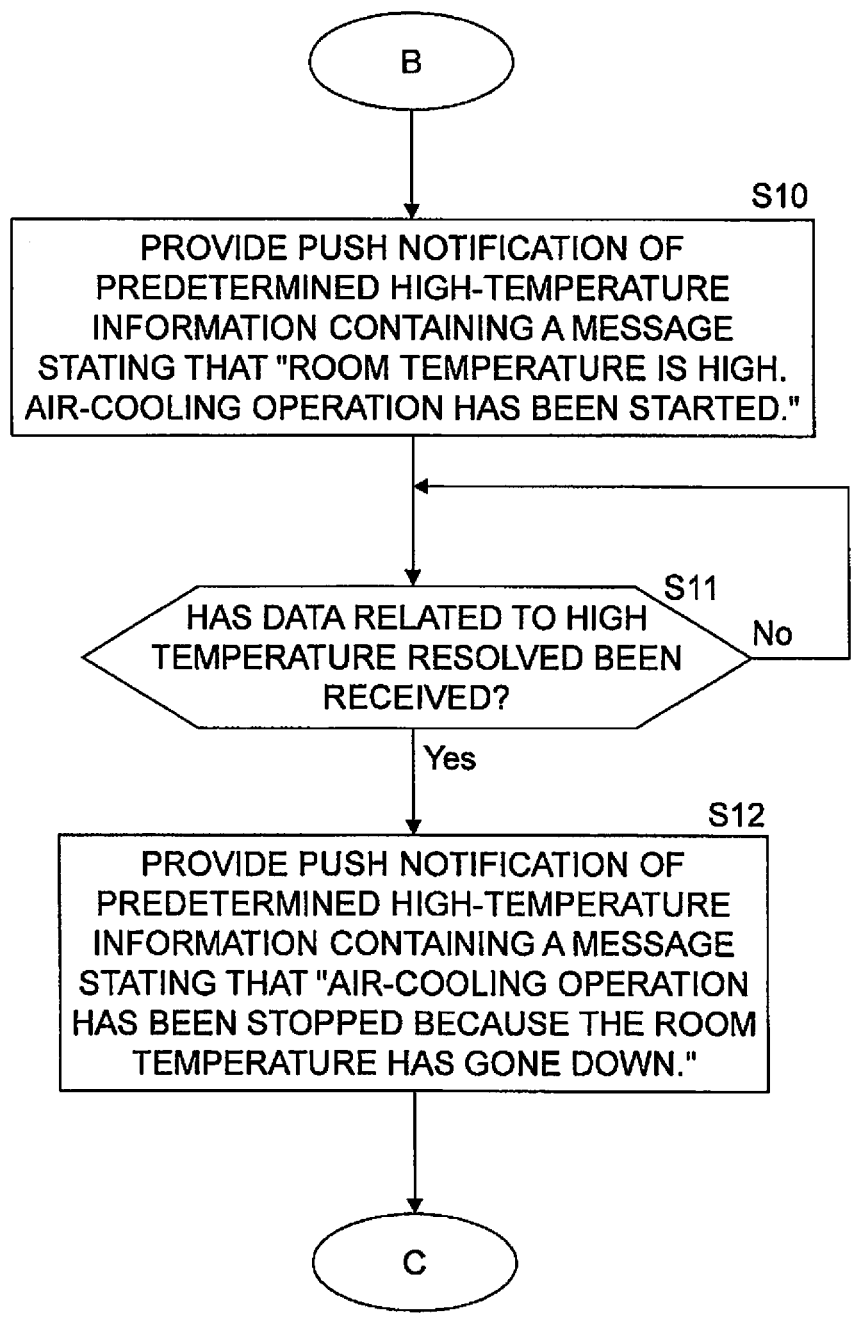
FIG. 9 is a flowchart showing the flow of push notification executed on a server.
Figure 10:
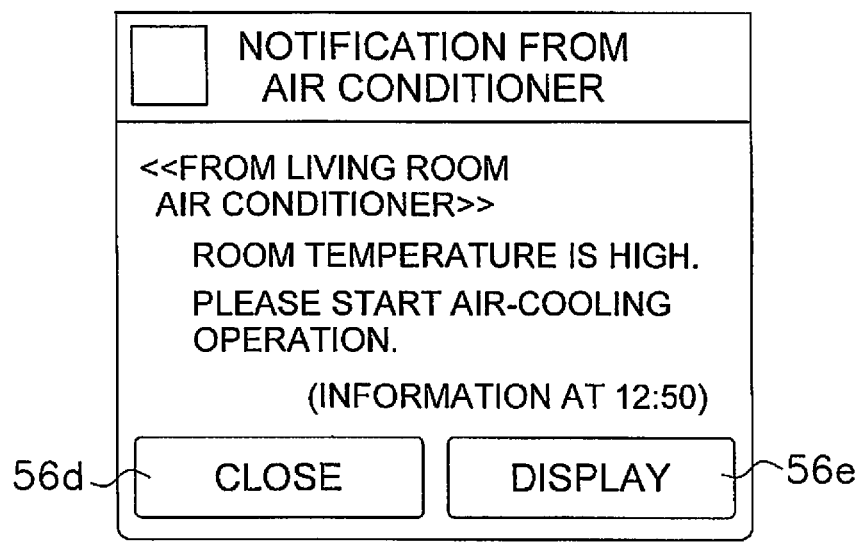
FIG. 10 shows an example of a push notification image.
Figure 11:
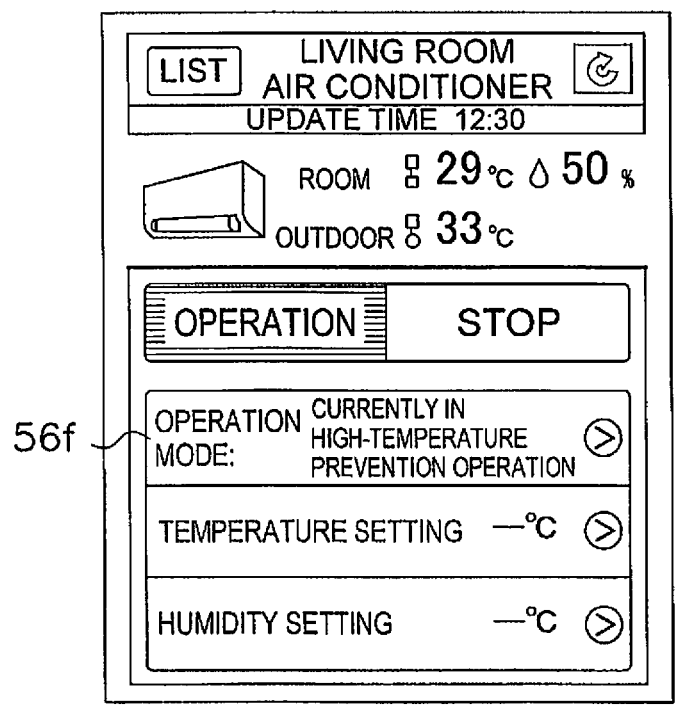
FIG. 11 shows an example of an action image.
Figure 12:
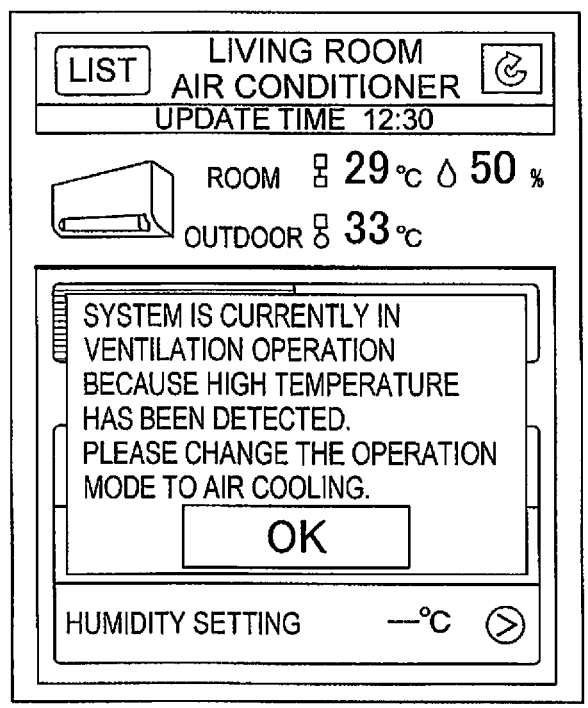
FIG. 12 shows an example in which an operation prompt message image displayed as a popup on the action image.
Figure 13:
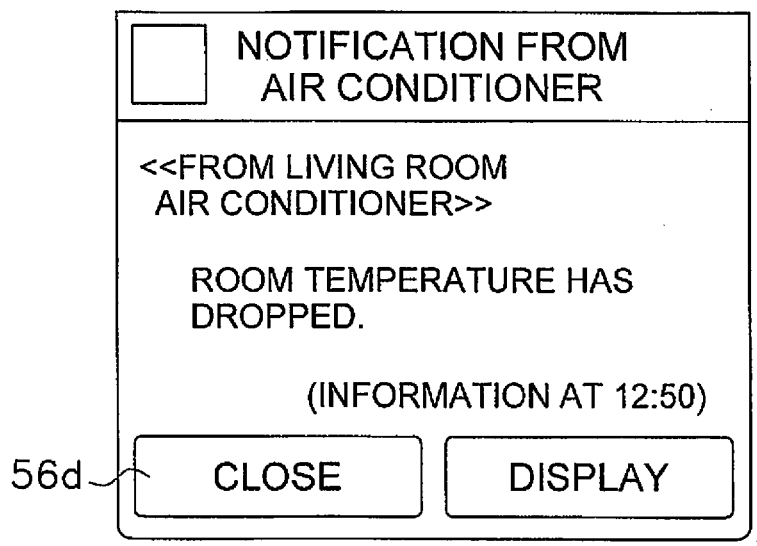
FIG. 13 shows an example of a push notification image.
Figure 14:
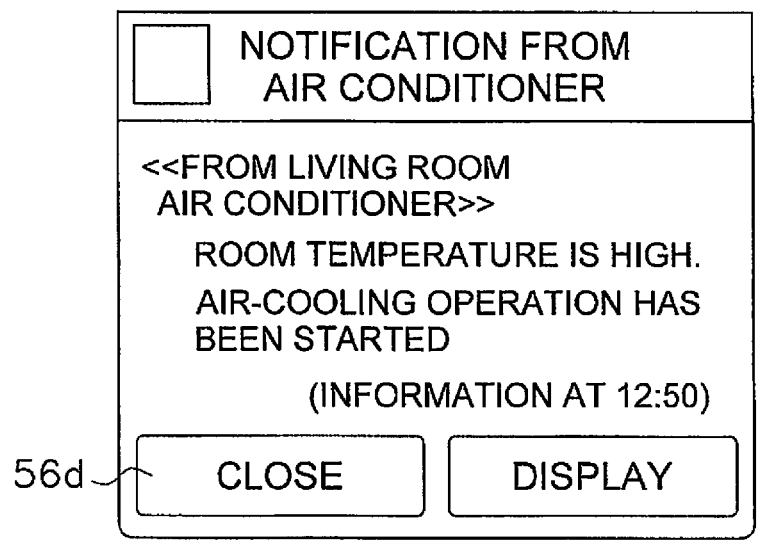
FIG. 14 shows another example a push notification image.
Figure 15:
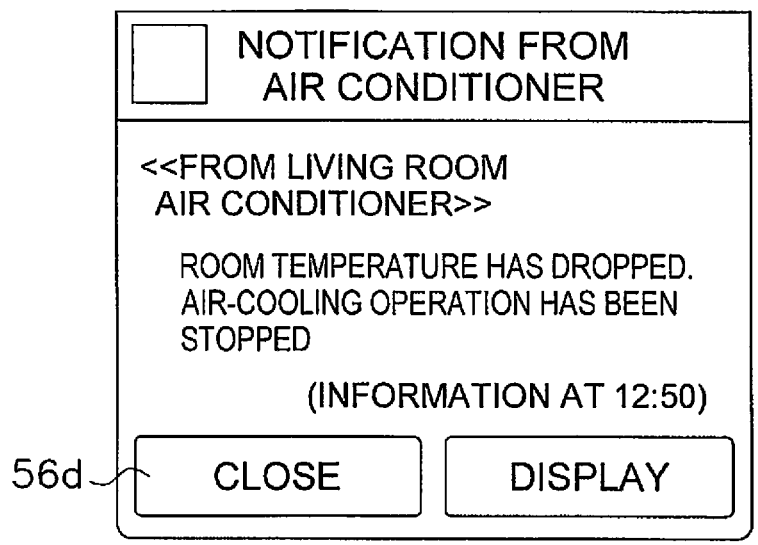
FIG. 15 shows further example a push notification image.

An example of the execution of push notification is described below with reference to FIGS. 7 to 15. FIGS. 7 to 9 are flowcharts showing the flow of processing in the server 40. FIGS. 10 to 15 illustrate an example of setting the equipment name of a single air conditioner among the plurality of air conditioners 10a, 10b, ... to "Living Room Air Conditioner." The processing described below is an example, and different processing can be carried out in the server 40.

In step S1, it is determined whether data related to a high-temperature state has been received. Specifically, when the rooms 30a, 30b, ... are in a predetermined high-temperature state, it is determined whether data related to a high-temperature state transmitted from the air conditioners 10a, 10b, ... to the server 40 via the adapters 20a, 20b, ... is saved in the periodic notification database 43a. When Yes is the determination, i.e., when data related to the high-temperature state is saved in the periodic notification database 43a, the process proceeds to step S2. Conversely, when "No" is the determination, i.e., when data related to the high-temperature state is not saved in the periodic notification database 43a, the process returns to step S1.

In step S2, permission for push notification is determined. Specifically, when the push notification setting is stored as "ON" in the settings information database 43c, i.e., when the push notification is set as being required, the process proceeds to step S3. Conversely, when the push notification setting is stored as "OFF" in the settings information database 43c, i.e., when the push notification is set as being not required, processing related to push notification is ended.

In step S3, it is determined whether the high-temperature prevention function is set to OFF. When the determination is Yes, i.e., when OFF is stored as the setting for the high-temperature prevention function in the settings information database 43c, the process proceeds to step S4. Conversely, when the determination is No, i.e., when ON is stored as the setting for the high-temperature prevention function in the settings information database 43c, the process proceeds to step S10.

In step S4, push notification of predetermined high-temperature information is sent to the smartphone 50 carried by the user. When the push notification is to be carried out, a push notification image (see FIG. 10) containing a message stating "Room temperature is high, please start air-cooling operation" and a "Close" button 56d and "Display" button 56e serving as the input section 56 is displayed as predetermined high-temperature information on the display screen 55 of the smartphone 50. The process then proceeds to step S5.

In step S5, it is determined whether there has been access to the server 40 from the user's smartphone 50 (mobile terminal). In this case, tapping the "Display" button 56e in the push notification image displayed on the display screen 55 brought about by a push notification starts up the air-conditioning management program and an information transmission request is transmitted from the smartphone 50 to the server 40. The server 40 determines whether there has been an information transmission request from the smartphone 50 and thereby determines that there has been access from the smartphone 50. When Yes is the determination, i.e., when there has been an information transmission request from the smartphone 50 to the server 40, the process proceeds to step S6. Conversely, when "No" is the determination, i.e., when there has not been an information transmission request from the smartphone 50 to the server 40, the process returns to step S5.

In step S6, since there has been access from the smartphone 50, it is determined whether data related to high-temperature-ended state has been transmitted from the adapters 20a, 20b, ... as periodic notification data. Specifically, push notification about predetermined high-temperature information is provided in step S4, and it is thereafter determined whether data related to the high-temperature-ended state transmitted from the air conditioners 10a, 10b, ... to the server 40 via the adapters 20a, 20b, ... has been saved in the periodic notification database 43a. When Yes is the determination, i.e., when data related to the high-temperature-ended state has been saved in the periodic notification database 43a, the process proceeds to step S9. Conversely, when "No" is the determination, i.e., when data related to the high-temperature-ended state has not been saved in the periodic notification database 43a, the process proceeds to step S7.

In step S7, information is transmitted in relation to an operation prompt message image for causing an operation prompt message image containing a message prompting operation startup to be displayed in a popup on the display screen 55 of the smartphone 50. The information related to an operation prompt message image is transmitted from the server 40 to the smartphone 50, whereby an operation prompt message image (see FIG. 12) containing the message "High temperature has been detected and a ventilation operation is being carried out. Please change the operation mode to air-cooling." is displayed in a popup as a message on the actuation screen (see FIG. 11) of the display screen 55. The process then proceeds to step S8.

The actuation image is used for actuating the air conditioners 10a, 10b, ... determined to be in a predetermined high-temperature state, and includes an "Operation mode" button 56f serving as the input section 56. Tapping the "Display" button 56e in the push notification image causes the image on the display screen 55 of the smartphone 50 to transition from the push notification image to the actuation image. Tapping the "Operation mode" button 56f on the actuation image allows the user, via the server 40, to set the operation mode of the air conditioners 10a, 10b, ... that have been determined to be in a predetermined high-temperature state to an air-cooling mode to start the air-cooling operation of the air conditioners 10a, 10b, ..., and to switch the operation mode from the ventilation mode to the air-cooling mode to switch the operation of the air conditioners 10a, 10b, ... from ventilation operation to air-cooling operation.

In step S8, it is determined whether data related to a high-temperature-ended state has been transmitted from the adapters 20a, 20b, ... as periodic notification data. Specifically, in step S7, a popup of the operation prompt message image is displayed, and it is thereafter determined whether data related to the high-temperature-ended state transmitted from the air conditioners 10a, 10b, ... to the server 40 via the adapters 20a, 20b, ... has been saved in the periodic notification database 43a. When Yes is the determination, i.e., when data related to the high-temperature-ended state has been saved in the periodic notification database 43a, the process proceeds to step S9. Conversely, when "No" is the determination, i.e., when data related to the high-temperature-ended state has not been saved in the periodic notification database 43a, the process returns to step S8.

In step S9, a push notification of the predetermined high-temperature-ended information is provided to the smartphone 50 carried by the user. When the push notification is provided, a message stating "Room temperature has gone down" as the predetermined high-temperature-ended information and a push notification image (see FIG. 13) containing the "Close" button 56d serving as the input section 56 are displayed on the display screen 55 of the smartphone 50. Processing related to push notification is thereby ended.

In step S10, a push notification of the predetermined high-temperature information is provided to the smartphone 50 carried by the user. When the push notification is provided, a message stating "Room temperature is high; air-cooling operation has been started" as the predetermined high-temperature information and a push notification image (see FIG. 14) containing the "Close" button 56d serving as the input section 56 are displayed on the display screen 55 of the smartphone 50. The process then proceeds to step S11.

In step S11, it is determined whether data related to the high-temperature-ended state has been transmitted from the adapters 20a, 20b, . . . as periodic notification data. Specifically, after a push notification of a predetermined high-temperature information has been provided in step S10, it is determined whether data related to the high-temperature-ended state transmitted from the air conditioners 10a, 10b, . . . to the server 40 via the adapters 20a, 20b, . . . has been saved in the periodic notification database 43a. When Yes is the determination, i.e., when data related to the high-temperature-ended state has been saved in the periodic notification database 43a, the process proceeds to step S12.

Conversely, when "No" is the determination, i.e., when data related to the high-temperature-ended state has not been saved in the periodic notification database 43a, the process returns to step S11.

In step S12, a push notification of predetermined high-temperature-ended information is provided to the smartphone 50 carried by the user. When the push notification is carried out, a message stating "Air-cooling operation has been stopped because the room temperature has gone down" as the predetermined high-temperature-ended information and a push notification image (see FIG. 15) containing the "Close" button 56d serving as the input section 56 are displayed on the display screen 55 of the smartphone 50. Processing related to push notification is thereby ended.

(5) Characteristics (5-1)

In the present embodiment, predetermined high-temperature information about the registered air conditioners 10a, 10b, . . . is provided to the smartphone 50 via a push notification. Accordingly, registering a plurality of air conditioners in not only one's home as the building 30, but also in different locations such as, e.g., a parent's home and/or a work place allows high-temperature information in different locations to be received in a single smartphone 50.

The user can thereby confirm the high-temperature state in different locations in a simple manner using a smartphone 50.

The user can confirm the predetermined high-temperature information without starting up the air-conditioning management program installed in the smartphone 50 and can thereby acquire the predetermined high-temperature information in a timely manner.

In the present invention, the predetermined high-temperature-ended information for the registered air conditioners 10a, 10b, . . . can be provided to the smartphone 50 by push notification. Accordingly, the user can realize by way of the push notification that actuation for starting the air-cooling operation of the air conditioners 10a, 10b, . . . is not required.

Furthermore, in the present embodiment, after it has been determined that the rooms 30a, 30b, . . . are in a predetermined high-temperature state and a push notification is provided, a push notification is not provided until it is determined that the high-temperature state of the rooms 30a, 30b, . . . has ended. In other words, a push notification of the high-temperature information is not provided even when the high-temperature state of the rooms 30a, 30b, . . . continues. This arrangement is used so that the user can confirm that the rooms 30a, 30b, . . . are in a predetermined high-temperature state by push notification of high-temperature information provided when the rooms 30a, 30b, . . . have been determined to be in a predetermined high-temperature state without repeated push notifications about a high-temperature information.

(5-2)

In the present embodiment, the air-conditioning management program is capable of displaying on the display screen 55 a settings screen for registering in the server 40, for each adapter 20a, 20b, . . . , the air conditioners 10a, 10b, . . . for which a push notification will be acquired. Accordingly, the user can register in the server 40, for each air conditioner 10a, 10b, . . . (for each adapter 20a, 20b, . . . ), the air conditioners 10a, 10b, . . . for which a push notification of predetermined high-temperature information and predetermined high-temperature-ended information will be acquired using the smartphone 50.

The user registers only predetermined air conditioners among a plurality of air conditioners at home, parent's home, and workplace for which a push notification will be acquired, thereby making it possible to acquire a push notification for only air conditioners of the rooms 30a, 30b, . . . for which the user desires to monitor the status, and allowing settings that correspond to the preferences of the user.

(5-3)

In the present embodiment, a "Display" button 56e serving as the input section 56 for causing the image to transition from a push notification image to an actuation image is included in the push notification image, the actuation image being used for actuating the air conditioners 10a, 10b, . . . determined to be in a predetermined high-temperature state and containing the "Operation mode" button 56f serving as the input section 56. The user taps the "Operation mode" button 56f in the actuation image displayed on the display screen 55, and is thereby able to transmit to the server 40 the actuation information for setting the operation mode of the air conditioners 10a, 10b, . . . determined to be in a high-temperature state to the air-cooling mode. Thus, merely tapping the "Display" button 56e in the push notification image displayed on the display screen 55 allows the user to cause the image to transition from the push notification image to the actuation image. Therefore, actuation for starting an air-cooling operation of the air conditioners 10a, 10b, . . . after a push notification can be carried out more simply than in the case in which the air-conditioning management program is started up after a push notification, the login ID and password are inputted, the air conditioners 10a, 10b, . . . determined to be in a predetermined high-temperature state are thereafter selected from a displayed equipment list image, and an operation is carried out for setting the operation mode of the air conditioners 10a, 10b, . . . to the air-cooling mode.

(5-4)

In the present embodiment, the phrase "high-temperature prevention operation" is displayed on the actuation image displayed on the display screen 55 not only when an air-cooling operation is being carried out by the air conditioners 10a, 10b, . . . , but also when monitoring is being carried out in the air conditioners 10a, 10b, . . . , i.e., when ventilation operation is being carried out. Accordingly, a user who has viewed the display of "high-temperature prevention operation" in the actuation image may possibly errantly assume that an air-cooling operation is being carried out by the air conditioners 10a, 10b, . . . even though a ventilation operation is being carried out.

In view of this possibility, in the present embodiment, the controller 42 in the server 40 provides a push notification of high-temperature information, and thereafter transmits an operation prompt message image to the smartphone 50 so that a popup of the operation prompt message image containing a message related to the operation startup of the air conditioners 10a, 10b, . . . is displayed when predetermined conditions have been satisfied. These predetermined conditions include a condition that the high-temperature prevention function has been set to OFF, a condition that the push notification setting has been set to ON, a condition that data related to the high-temperature-ended state has not been transmitted after a push notification of high-temperature information has been carried out, and a condition that there has been access from the smartphone 50. Having received the information about the operation prompt message image, the air-conditioning management program displays a popup of the operation prompt message image containing a message related to operation startup of the air conditioners 10a, 10b, . . . on the actuation image of the display screen 55. Accordingly, the user can be prompted to start the air-cooling operation of the air conditioners 10a, 10b, . . . .

(5-5)

In the monitoring of the present embodiment, ventilation operation for circulating air in the rooms is carried out, after which it is determined whether the rooms 30a, 30b, . . . in which the room units 11a, 11b, . . . are installed are in a predetermined high-temperature state on the basis of the detection results of the room temperature sensor 14a. Accordingly, the possibility of errantly determined whether the rooms 30a, 30b, . . . are in a high-temperature state can be reduced in comparison with monitoring without a ventilation operation.

It is thereby possible to reduce the likelihood that frequent push notification will be carried out.

(6) Modifications (6-1) Modification A

In addition to the above-described embodiment, the air-conditioning management program may be designed so that the equipment names of the air conditioners 10a, 10b, . . . cannot be set in duplicate when the user actuates the smartphone 50 to set the equipment 16 name of the air conditioners 10a, 10b, . . . as the equipment setting of the air conditioners 10a, 10b, . . . . The user more readily recognizes which of the air conditioners 10a, 10b, . . . the information is related to among the plurality of air conditioners 10a, 10b, . . . installed in the building 30 when a plurality of air conditioners 10a, 10b, . . . are registered in the server 40.

(6-2) Modification B

The push notification of the predetermined high-temperature information and the predetermined high-temperature-ended information may be provided to each mobile terminal 50 when the user owns a plurality of mobile terminals 50.

(6-3) Modification C

Figure 16:
FIG. 16 shows an example of the equipment list image after push notification.

In addition to the above-described embodiment, when new data related to each of the air conditioners 10a, 10b, . . . has been transmitted from the adapters 20a, 20b, . . . to the server 40 after a push notification, a predetermined mark (e.g., "N" or the like such as shown in FIG. 16) may be displayed on the equipment list image displayed on the display screen 55 of the smartphone 50 so that the user can confirm that there is new information when the air-conditioning management program has been started up.

Furthermore, the history of each mobile terminal 50 may be managed so that past history can be confirmed on each mobile terminal 50. History management is preferably carried out using the number of events rather than dates in order to prevent unconfirmed history information from being deleted.

(6-4) Modification D

In the above-described embodiment, a push notification is provided only when the push notification setting is "ON" and the external actuation setting is "ON." In lieu thereof, a push notification may be provided with when the push notification setting is "ON" and the external actuation setting is "OFF."

(6-5) Modification E

In addition to the above-described embodiment, notification may be provided by audio from the room units 11a, 11b, . . . that the rooms 30a, 30b, . . . are in a predetermined high-temperature state and/or that the high-temperature state of the rooms 30a, 30b, . . . has been resolved. Furthermore, notification may be provided by audio from the room units 11a, 11b, . . . that the high-temperature state of the rooms 30a, 30b, . . . continues.

(6-6) Modification F

In addition to the above-described embodiment, it is possible to provide no push notification from the server 40 about high-temperature information and high-temperature-ended information because there may be cases in which information provided to the smartphone 50 cannot be made consistent when the setting of the high-temperature prevention function and/or the operating mode is changed and the monitoring and/or air-cooling operation of the air conditioners 10a, 10b, . . . has been stopped.

(6-7) Modification G

In the above-described embodiment, a notification LED in the room units 11a, 11b, . . . may be turned on so that the user in each of the rooms 30a, 30b, . . . can recognize that a ventilation operation is ongoing during monitoring.

During monitoring, switching the operation mode from ventilation operation to air-cooling operation can be carried out from the remote control 15 and the smartphone 50, but the system may be designed so that actuation for stopping operation of the air 265 conditioners 10a, 10b, . . . cannot be carried out using the remote control 15 and the smartphone 50 during ventilation operation during monitoring, push notification of high-temperature information, and air-cooling operation for preventing high temperature. In this case, an image containing a message stating that "Operation cannot be stopped due to high-temperature prevention operation" may be displayed on the display screen 55 of the smartphone 50 so that the user who is away can recognize that he cannot perform actuation for stopping operation of the air conditioners 10a, 10b, . . . .

(6-8) Modification H

In the monitoring of the embodiment described above, the rooms 30a, 30b, . . . are determined to be in a predetermined high-temperature state when the temperature detected by the room temperature sensor 14a is a predetermined temperature (e.g., 30° C.) or higher after ventilation operation.

In lieu thereof, it is also possible to use detection results obtained by the room temperature sensor 14a and a room humidity sensor to determine whether the rooms 30a, 30b, . . . are in a predetermined high-temperature state in the case that the room units 11a, 11b, . . . have a room humidity sensor for detecting the humidity of the rooms in which the room units 11a, 11b, . . . are installed.

Figure 17:
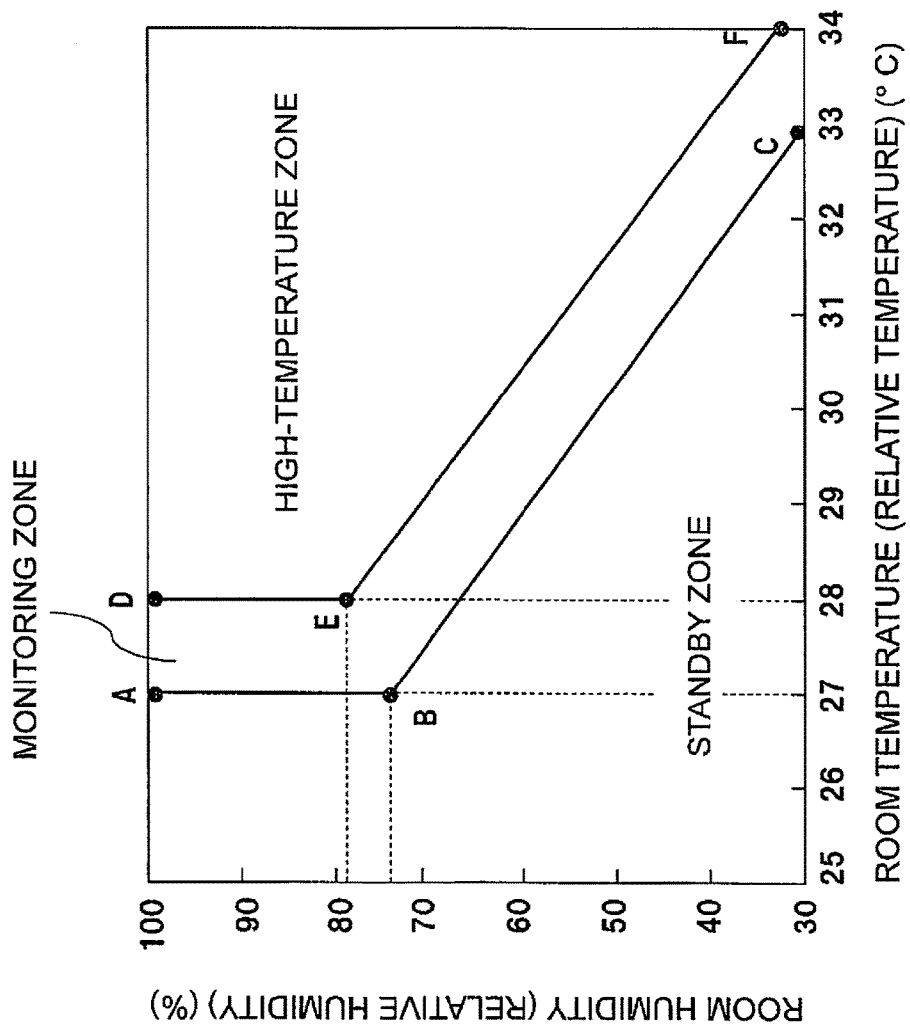
FIG. 17 is an assessment chart according to modification H.

For example, an assessment chart divided in to a high-temperature zone, a monitoring zone, and a standby zone, as shown in FIG. 17, may be used when the room temperature and the room humidity are to be used for determining whether a predetermined high-temperature state exists. In this case, the high-temperature zone is a region in which the room is in a high-temperature, high-humidity state and the room temperature and room humidity must be reduced. The monitoring zone is a region near the high-temperature zone and in which the room temperature and/or the room humidity may readily change to the high-temperature zone. The standby zone is a region far from the high-temperature zone and in which the room temperature and/or room humidity is not required to be reduced.

In the assessment chart of FIG. 17, points A to F indicates predetermined room temperature and room humidity points. At point A, the room temperature is 27° C. and the room humidity is 100%. At point B, the room temperature is 27° C. and the room humidity is between 70 and 80%. At point C, the room temperature is 33° C. and the room humidity is 30%. At point D, the room temperature is 28° C. and the room humidity is 100%. At point E, the room temperature is 28° C. and the room humidity is between 70 and 80%. At point F, the room temperature is 34° C. and the room humidity is between 30 and 40%. Also, the line connecting points A, B, and C is the line between the standby zone and the monitoring zone, and the line connecting points D, E, and F are lines between the monitoring zone and the high-temperature zone.

The controller 13 determines that the rooms 30a, 30b, . . . are in a predetermined high-temperature state when the detection results obtained by the room temperature sensor 14a and the room humidity sensor are in the high-temperature zone. The controller 13 also determines the rooms 30a, 30b, . . . to be in a predetermined high-temperature state when the detection results obtained by the room temperature sensor 14a and the room humidity sensor are in the monitoring zone, a ventilation operation is first carried out so that the room temperature and the room humidity are correctly detected, and the detection results obtained by the room temperature sensor 14a and the room humidity sensor have thereafter migrated to the high-temperature zone. Conversely, the controller 13 determines that the rooms 30a, 30b, . . . are not in the predetermined high-temperature state when the detection results obtained by the room temperature sensor 14a and the room humidity sensor have migrates from the monitoring zone to the standby zone after ventilation operation. The controller 13 furthermore determines that the rooms 30a, 30b, . . . are not in the predetermined high-temperature state when detection results obtained by the room temperature sensor 14a and the room humidity sensor are in the standby zone.

Thus, determining whether the rooms 30a, 30b, . . . are in a predetermined high-temperature state with consideration given to not only the room temperature, but also the room humidity allows the user to ascertain the state of the rooms 30a, 30b, . . . in detailed fashion.

Carrying out ventilation operation only when the room temperature and the room humidity are in the monitoring zone during monitoring makes it possible to obtain energy savings in comparison with the case in which the ventilation operation is constantly carried out during monitoring.

INDUSTRIAL APPLICABILITY

The present invention allows a user to confirm high-temperature information in different locations in a simple manner using a mobile terminal, and effective application is made to an air conditioning system in which information exchange is carried out between an air conditioner and a mobile terminal via an information mediation device.

What is claimed is:

1. An air conditioning system comprising:
air conditioners having a room temperature sensor to detect the temperature of rooms;
a mobile terminal carried by a user of the air conditioners, the mobile terminal storing an air-conditioning management program capable of causing an image containing information related to a registered plurality of the air conditioners to be displayed on a display screen of the mobile terminal; and
information mediation devices configured to cause exchange of information between the air conditioners and the mobile terminal using a public circuit, the information mediation devices providing push-notification about high-temperature information to the mobile terminal so as to allow the user to confirm high-temperature information corresponding to determination results when the rooms have been determined to be in a predetermined high-temperature state based on detection results of the room temperature sensor of the registered air conditioners, and the information mediation devices having an adapter connected to each of the air conditioners,
the push notification image being displayed on the display screen of the mobile terminal when a push notification has been carried out, the push notification including an input section to transmit from the push notification image to an actuation image to transmit information related to start of operation of the air conditioner to information mediation device,
the air-conditioning management program being configured to cause a registration image useable to register the air conditioners for each of the adapters to be displayed on the display screen of the mobile terminal, and
the input section including an actuation button to actuate the air conditioners determined to be in the predetermined high-temperature state.

2. The air conditioning system according to claim 1, wherein
the air conditioners determine whether the rooms are in the predetermined high-temperature state based on detection results of the room temperature sensor after an air-ventilation operation has been carried out.

3. An air conditioning system comprising:
air conditioners having a room temperature sensor to detect the temperature of rooms;
a mobile terminal carried by a user of the air conditioners, the mobile terminal storing an air-conditioning management program capable of causing an image containing information related to a registered plurality of the air conditioners to be displayed on a display screen of the mobile terminal, and information mediation devices configured to cause exchange of information between the air conditioners and the mobile terminal using a public circuit, the information mediation devices providing push-notification about high-temperature information to the mobile terminal so as to allow the user to confirm high-temperature information corresponding to determination results when the rooms have been determined to be in a predetermined high-temperature state based on detection results of the room temperature sensor of the registered air conditioners, and the information mediation devices having an adapter connected to each of the air conditioners, the push notification image being displayed on the display screen of the mobile terminal when a push notification has been carried out, the push notification including an input section to transmit from the push notification image to an actuation image to transmit information related to start of operation of the air conditioner to information mediation device, the air-conditioning management program being configured to cause a registration image useable to register the air conditioners for each of the adapters to be displayed on the display screen of the mobile terminal, and the input section being configured to make a transition from the push notification image to an actuation image to transmit information related to air conditioner operation startup to the information mediation devices.

4. The air conditioning system according to claim 3, wherein the air-conditioning management program causes a popup message image to display on the actuation image to prompt the start of operation of the air conditioner when a transition has been made from the push notification image to the actuation image.

5. The air conditioning system according to claim 4, wherein the air conditioners determine whether the rooms are in the predetermined high-temperature state based on detection results of the room temperature sensor after an air-ventilation operation has been carried out.

6. The air conditioning system according to claim 3, wherein the air conditioners determine whether the rooms are in the predetermined high-temperature state based on detection results of the room temperature sensor after an air-ventilation operation has been carried out.

* * * * *